(12) United States Patent
Sadow

(10) Patent No.: US 7,629,766 B2
(45) Date of Patent: Dec. 8, 2009

(54) ADAPTER SYSTEM FOR BATTERY-POWERED TOOLS

(75) Inventor: Bernard Sadow, Chappaqua, NY (US)

(73) Assignee: BBS Licensing, Inc., Chappaqua, NY (US)

( * ) Notice: Subject to any disclaimer, the term of this patent is extended or adjusted under 35 U.S.C. 154(b) by 361 days.

(21) Appl. No.: 11/488,372

(22) Filed: Jul. 17, 2006

(65) Prior Publication Data

US 2008/0012526 A1  Jan. 17, 2008

(51) Int. Cl.
  *H02J 7/02* (2006.01)
  *H02J 7/00* (2006.01)
  *H05B 11/00* (2006.01)
  *E21B 3/00* (2006.01)

(52) U.S. Cl. .................. 320/111; 320/112; 320/113; 320/114; 320/150; 173/217; 219/225

(58) Field of Classification Search ................ 320/111, 320/112–114, 150; 173/217
See application file for complete search history.

(56) References Cited

U.S. PATENT DOCUMENTS

| | | | |
|---|---|---|---|
| 4,988,584 A | 1/1991 | Shaper | |
| 5,076,805 A | 12/1991 | Welch | |
| 5,354,215 A | 10/1994 | Viracola | |
| 6,656,626 B1 | 12/2003 | Mooty et al. | |
| 6,840,335 B1 | 1/2005 | Wu | |
| 6,876,173 B2 * | 4/2005 | Mastaler et al. | 320/114 |
| 2003/0121682 A1 * | 7/2003 | Carrancho | 173/217 |

* cited by examiner

*Primary Examiner*—Edward Tso
*Assistant Examiner*—Yalkew Fantu
(74) *Attorney, Agent, or Firm*—Abelman, Frayne & Schwab

(57) ABSTRACT

An adapter system for providing power to a portable power tool when the original equipment rechargeable battery is removed from the tool and carried separately by the user includes a power tool connector having a contact member configured for insertion into the tool handle receptacle to provide electrical connectivity, a battery connector having a battery receptacle configured to receive the contact member of the battery and a power cord coupled to the tool connector and the battery connector; the adapter system can optionally include a supporting holster or carrier for the battery and connector that can be affixed to the user's belt or a strap or harness worn by the user.

24 Claims, 5 Drawing Sheets

ADAPTER SYSTEM FOR BATTERY-POWERED TOOLS

BACKGROUND OF THE INVENTION

1. Field of the Invention

The present invention relates to battery-powered cordless power tools. More specifically, the invention relates to a battery adapter system for a cordless power tool.

2. Description of Related Art

Cordless power tool systems including releasably attachable rechargeable battery units are widely known in the pertinent arts. Each portable power tool includes a housing that incorporates its own essential elements, such as an electric motor and a work element (e.g., reciprocating chuck for receiving a saw blade, rotatable chuck for receiving a drill bit, and the like), which are attached to the housing and driven by the motor. The motor, and therefore the work element, is powered by a portable rechargeable battery, or battery pack that is releasably attached to the housing of the power tool.

Various interfaces are known for electrically and physically coupling the battery or rechargeable battery pack in an electrical apparatus such as the housing of a power tool or a battery charger. In one known manner of operatively connecting a rechargeable battery to an electrical apparatus, a contact member of the rechargeable battery physically extends into the tool handle for engagement of associated electrical terminals. Such an arrangement is occasionally referred to as a plug-in type interface.

As used herein, the term "battery" will be understood to include a single rechargeable battery or a battery pack consisting of two or more batteries.

The useful time of a fully-charged battery will vary and will be shorter when the power tool requires a large amount of electrical power to perform its work. Such batteries can be considered relatively expensive in terms of the down-time required to recharge the battery, as well as the cost to either replace or purchase a separate back-up battery. Furthermore, the battery substantially increases the weight of the tool, resulting in user fatigue, since the majority of these power tools are designed to be hand-held.

In U.S. Pat. No. 5,076,805 to Welch, a handheld power tool is disclosed with an adapter that replaces the battery normally placed in the battery compartment of the device, where the adapter is capable of connecting to an external automotive battery. In U.S. Pat. No. 5,354,215 to Viracola, an interconnecting circuit element is placed in an internal battery compartment of the power tool which connects the power tool to a power source socket, such as a cigarette lighter socket of a vehicle. These devices are provided in order to extend the time that the tool can be used under the particular circumstances of accessibility to an alternative power source. However, hand tool battery output voltages vary among manufacturers and few, if any, correspond to the 12 volts of automotive batteries. Transformers would therefore be required to provide the correct voltage to the tool.

The approach exemplified by Welch and Viracola do ameliorate the disadvantages of batteries mentioned above, but they create other problems the use of batteries were meant to solve, namely, the lack of a conveniently available power source. Even though an automotive vehicle can be moved to many job sites, the user of a power tool is still limited to a semi-fixed electrical source, as envisioned by Welch or Viracola. Thus, the range that the user is able to use the power tool is limited by the length of the power cord connecting the Welch or Viracola tool to the automotive or other electrical outlet.

U.S. Pat. No. 4,988,584 to Shaper discloses that in order to supply electrical power from a rechargeable battery pack to a battery-powered flash unit, the individual batteries (e.g., four AA sized batteries) that normally power the flash unit are manually removed from a battery compartment provided in the unit, and a "power module" adapter is inserted into the compartment thereafter. A twin-conductor cable has one end connected to the power module adapter and an opposing end furnished with a connector. The connector is plugged into a rechargeable battery pack, thereby enabling electrical power to be provided from the battery pack to the flash unit.

Although the rechargeable battery pack in Shaper is described as being portable and capable of being carried by a person along with the flash unit, the portable battery pack is a separate device and is not truly interchangeable with the batteries normally inserted in the flash unit when the battery pack is not being utilized. Thus, the separate battery pack of Shaper is costly in terms of the additional expense of having to purchase the rechargeable battery pack. Furthermore, the batteries that are normally used to power the flash unit are different in size and shape from the rechargeable battery pack. That is, the battery pack is not an interchangeable plug-in battery for the flash unit. When the user of such an electronic flash unit removes the batteries normally used to power the device in order to insert the power module, the user must store them in a place that they will not get lost while they are not being used, as well as remember to replace them for the next time the flash unit is going to be used.

Therefore, there is a need in the art for an adapter capable of providing power to a portable power tool from a battery that is normally sold and used integrally with the power tool when the battery is removed to lighten the tool, as well as one that will enable the user to perform work tasks with the power tool without being restricted by the length of an attached extension power cord leading to an alternative power source.

As used herein, the terms "original battery" or "original equipment battery" means the battery sold by the tool manufacturer, or others, that are specially configured to mate with the tool, usually by insertion into the handle of the tool. Tradesmen commonly purchase at least two such rechargeable batteries so they can continue working while a battery is being charged.

SUMMARY OF THE INVENTION

The disadvantages associated with the prior art battery-powered tools are overcome by the adapter system of the present invention that includes a male tool connector having a pair of conductive terminals that is received in the tool receptacle in place of the original battery and a female connector having a pair of conductive terminals that engage the battery terminals, the two connectors being joined by an electrically conductive cord. The adapter system enables the user of a power tool to remove the portable battery from the tool and carry this original battery on the user's belt, a tool harness, or in a special carrying device, such as by a strap that extends around the waist or over the shoulder of the user. The adapter system provides electrical connectivity between the portable power tool and the original battery via the power cord. Accordingly, the user can remove the battery from the tool to decrease the overall weight of the power tool, which enables the user to more easily maneuver the portable power tool, as well as reduce fatigue because of the tool's reduced weight during extended periods of use.

The adapter system of the invention further comprehends attaching two or more fully-charged batteries in a parallel circuit by means of a corresponding number of female connectors to provide longer period of use.

In one embodiment, the adapter system of the present invention includes a power tool male connector, a battery female connector, and a power cord providing conductivity between the connectors. The power tool connector is configured for insertion into the tool housing receptacle in place of the battery terminals. The battery connector has a battery housing receptacle configured to receive the terminals of the battery. The electric power cord extends between the respective terminals of the two connectors enabling the battery to provide power to the portable power tool.

BRIEF DESCRIPTION OF THE DRAWINGS

The above and additional features of the present invention will be readily understood by considering the following detailed description in conjunction with the accompanying drawings, in which.

To facilitate an understanding of the invention, the same reference numerals are used, when appropriate, to designate the same elements that are common to the figures. Further, unless stated otherwise, the figures are not drawn to scale, but are shown for illustrative purposes only.

DETAILED DESCRIPTION OF THE INVENTION

Figure 1:
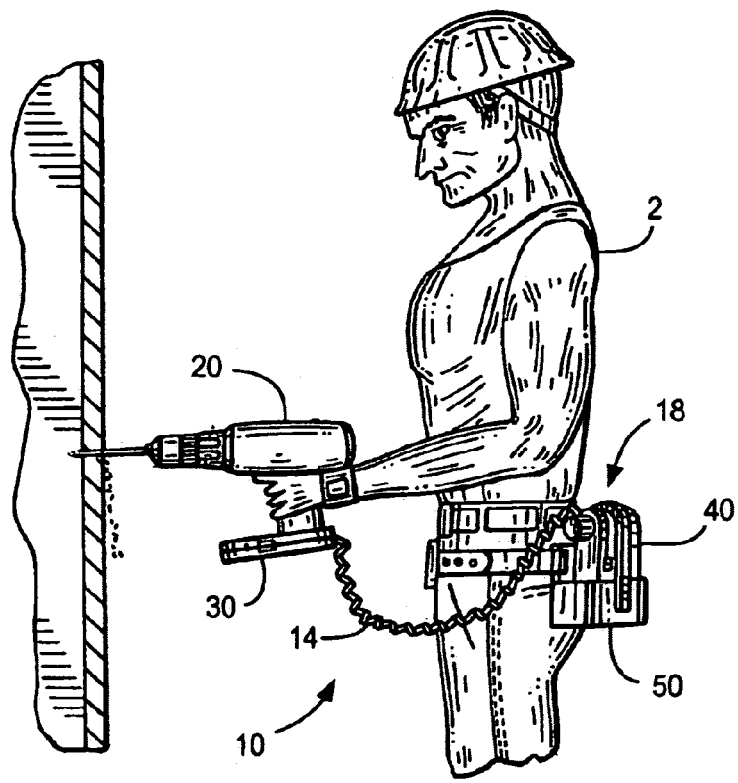
FIG. 1 is an illustrative side view of a person using an adapter system of the present invention to provide power from a detachable battery to the portable power tool from which the battery has been removed.

Referring now to FIG. 1, a user 2 is illustrated holding a tool fitted with an adapter system 10 in accordance with the present invention that is suitable for providing power from a detachable rechargeable battery 50 designed for insertion in the handle of portable power tool 20. In this embodiment, the adapter system 10 comprises a power tool connector 30 configured for attachment with the power tool 20, a battery connector 40 configured for mating engagement with the battery 50, and a power cord 14 to provide electrical connectivity between the connectors.

As illustratively shown in FIG. 1, the battery 50 is removed from its normal position attached to the power tool 20 and is remotely located at a convenient location on the user's person, such as portable battery carrier 18. The portable battery carrier 18 can be carried on the waist or over a shoulder. Thus, the adapter system 10 of the present invention enables a user to reduce the overall handling or manual weight of the power tool 20 by carrying the battery 50 remote from, but electrically tethered to the power tool. This enables the user to more freely and conveniently perform various work tasks with the power tool 20 by reducing its weight.

Figure 2:
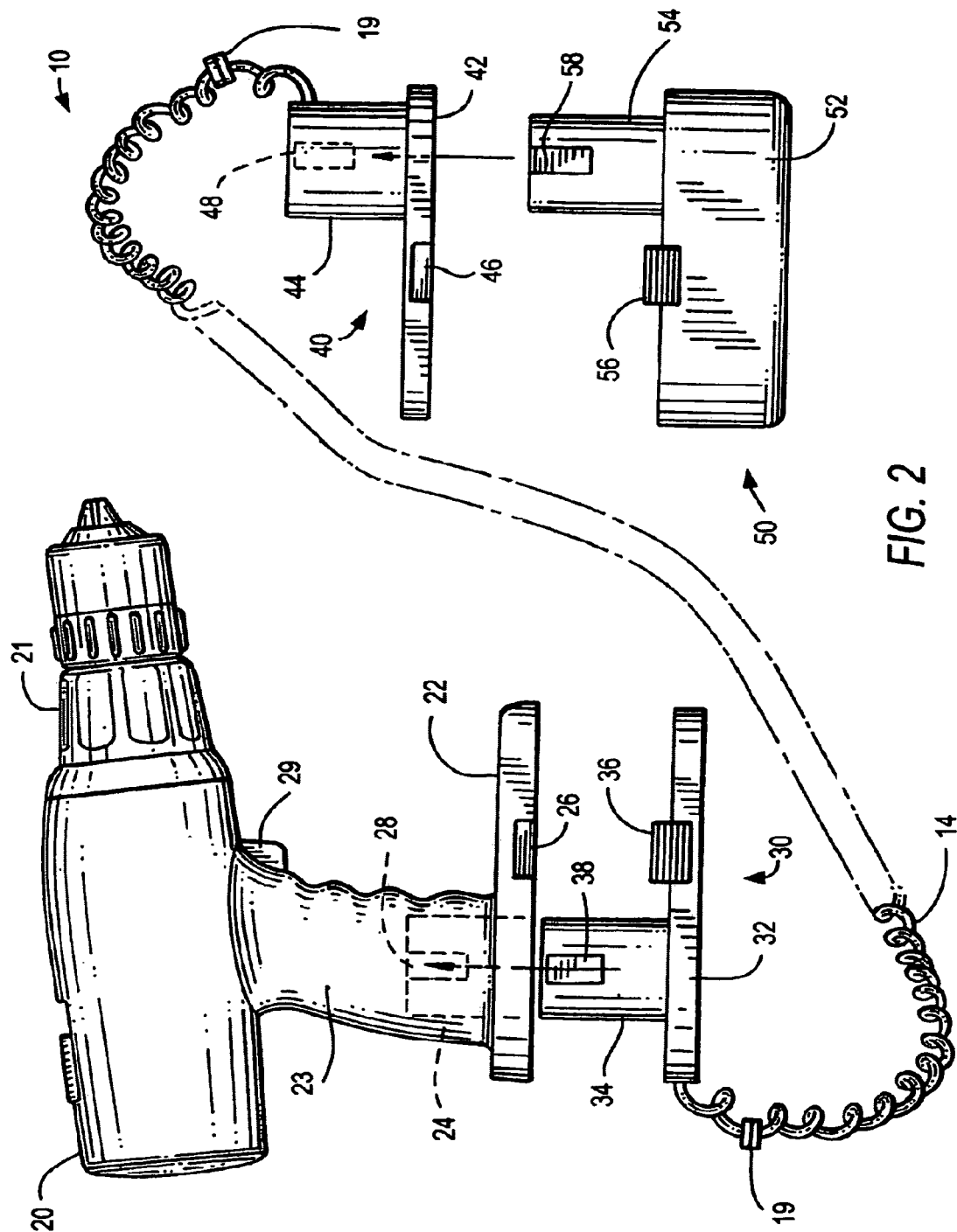
FIG. 2 is a side elevation, partially exploded view of a preferred embodiment of the adapter system of the present invention.

FIG. 2 illustrates one embodiment of the adapter system 10 and the relationship of the elements when detached. The power tool and battery can be any portable power tool, such as a cordless drill, lantern, circular saw, reciprocating saw, or any other cordless power tool incorporating a removably attachable and rechargeable battery for powering a motor that operates the tool.

Referring to FIG. 2, the power tool 20 is illustratively shown to be a portable hand-held drill comprising a housing 21 containing the motor and chuck, a base 22 formed as part the handle, a receptacle 24 (shown in phantom) in the handle 23, and terminals 28 positioned within the tool receptacle 24. The base 22 and tool receptacle 24 are sized to accommodate and retain battery 50 by means of engagement member 26.

The original battery 50 comprises a housing 52, a battery contact member 54 having terminals 58, and a battery locking and release mechanism 56. For the plug-in type of interface between the power tool and the battery 50, the battery contact member 54 is inserted into the tool receptacle 24, where the terminals 58 on the battery contact member 54 contact corresponding terminals 28 in receptacle 24 for electrically connecting the battery 50 with a motor of the power tool 22 through a manual switch 29. The lower portion of the battery 50 is wider than the battery contact member 54 and accommodates the battery cells for providing power, as well as a surface area and an edge that supports attachment of the battery 50 to the tool housing 22.

The battery release mechanism 56 allows the battery 50 to be detached and removed from the power tool 20 for recharging, as well as remote use in accordance with the principles of the present invention. Existing battery release mechanisms 56 include latching arrangements that releasably secure the battery 50 to the power tool 20. Prior art release mechanisms can include two push buttons disposed on opposing sides of the battery housing. In these arrangements, the battery 50 extends upward into the handle of the power tool 20. In order to remove the battery 50 from the power tool 20, the user depresses both buttons and pulls downwardly on the battery 50 to disengage the battery pack from the power tool 20. Other battery release mechanisms have a button disposed in the rear of the power tool. The user can release the battery pack from the power tool by depressing the button or moving a latch or clip, such that the latching arrangement allows removal of the battery pack.

With continuing reference to FIG. 2, the battery release mechanism include a clasp 56 attached to the base 52 of the battery 50. A corresponding latch receptacle 26 is formed on the base 22 of the power tool. Other conventional battery release mechanisms known to the art or subsequently developed can also be utilized, and such battery retaining mechanism illustratively shown in FIG. 2 are not to be considered as limiting the present invention.

Figure 3A:
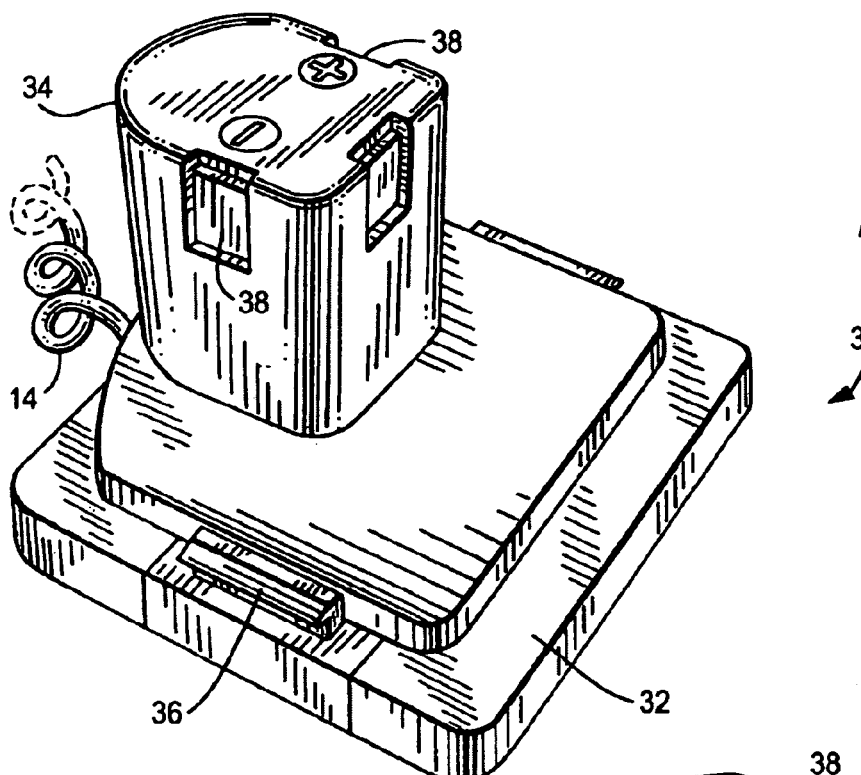
FIGS. 3A and 3B are perspective views of the power tool connector shown in FIG. 2.
Figure 3B:
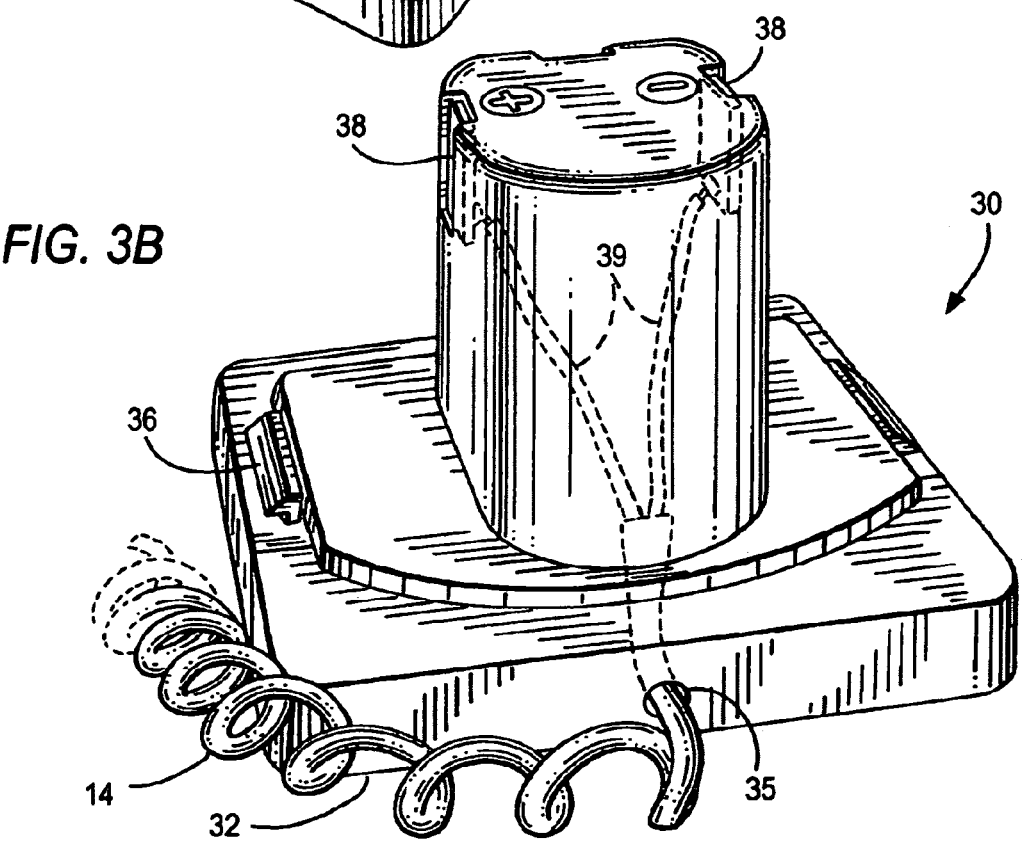

The adapter system 10 of the present invention is utilized after the battery 50 is removed from the cordless power tool 20. Referring to FIGS. 3A and 3B in conjunction with FIG. 2, the tool connector 30 is configured to physically engage and provide electrical contact with the base 22 and tool receptacle 24. The tool connector 30 comprises a base 32, a contact member 34, a retaining mechanism 36, and terminals 38. The contact member 34 is sized to be inserted into, and removed from the tool housing receptacle 24. Although the contact member 34 is shown as extending approximately 90° from an upper surface of the base 32, this configuration is not be considered as limiting. The power tool adapter 30 can mimic the size and shape of the battery 50, as in the form of a molded hollow member, and therefore lightweight replica.

The position of the terminals 38 on the tool connector correspond to the position of the pair of terminals 28 in the tool receptacle 24. When the contact member 34 of tool connector 30 is inserted into the power tool receptacle 24, each terminal 38 of the tool connector 30 is aligned and in contact with a corresponding terminal 28 in the power tool 20.

In one embodiment, the terminals 38 of the connector 30 include indicia of polarity. For example, positive (+) and negative (−) symbols are provided proximate the respective terminal. The polarity indicators may be provided by labeling, and/or be molded into the surface of the contact member 34, among other conventionally known marking techniques.

In another preferred embodiment, the shape of the contact member 34 is keyed to match the conventional keyed shape of the battery 50. As shown in FIGS. 3A and 3B, the contact member 34 has a semi-circular sidewall portion and a substantially planar sidewall portion, both of which correspond to a semi-circular sidewall portion and a substantially planar sidewall portion formed in the tool receptacle 24. As such, the connector 30 can only be inserted when the planar side of the connector 30 is aligned with the planar side formed in the receptacle 24. One skilled in the art will recognize that other conventional techniques for keying the connector 30 to the tool receptacle 24 can be utilized. For example, the battery release mechanism 26 and corresponding adapter release 36 may be keyed, or the bases 22 and 32 can have a particular mating shape that serves as a key.

When the connector 30 is inserted into the tool receptacle 24, the retaining mechanism 36 is aligned and engages the retaining mechanism 26 formed on the base 22 of the power tool 20. That is, the connector retaining mechanism 36 is compatible with the power tool retaining mechanism 26, and is releasable from the base 22 of the power tool 20 in a similar manner as described above with regard to the battery 50. Preferably, the battery retaining mechanism 56 is also implemented on the connector 30.

Referring to FIG. 3B, the power cord 14 includes a pair of conductors 39, each affixed to a corresponding terminal 38. A first end of the conductors 39 are securely fastened by any conventional technique, such as by soldering or threaded fasteners, among other well known techniques. In one embodiment, an orifice 35 is formed in the base 32 of the tool connector 30 for routing the power cord conductors 39 to the terminals 38. Preferably, the power cord 14 is routed through the rear portion of the base 32. Alternatively, the power cord 14 can be routed through an opening 35 formed on any side or bottom surface of the base 32.

In yet another embodiment, the power cord 14 can be routed through an opening 35 formed in the contact member 34. In this embodiment, a corresponding groove or cut-out (not shown) is provided in the base 32 or handle of the power tool 20 to accommodate the power cord 14 when inserted into the receptacle 24. In a further alternative embodiment, the wire is routed along the interior or exterior of the base plate and appropriately secured so that it will not be inadvertently disconnected from the terminals.

Figure 4A:
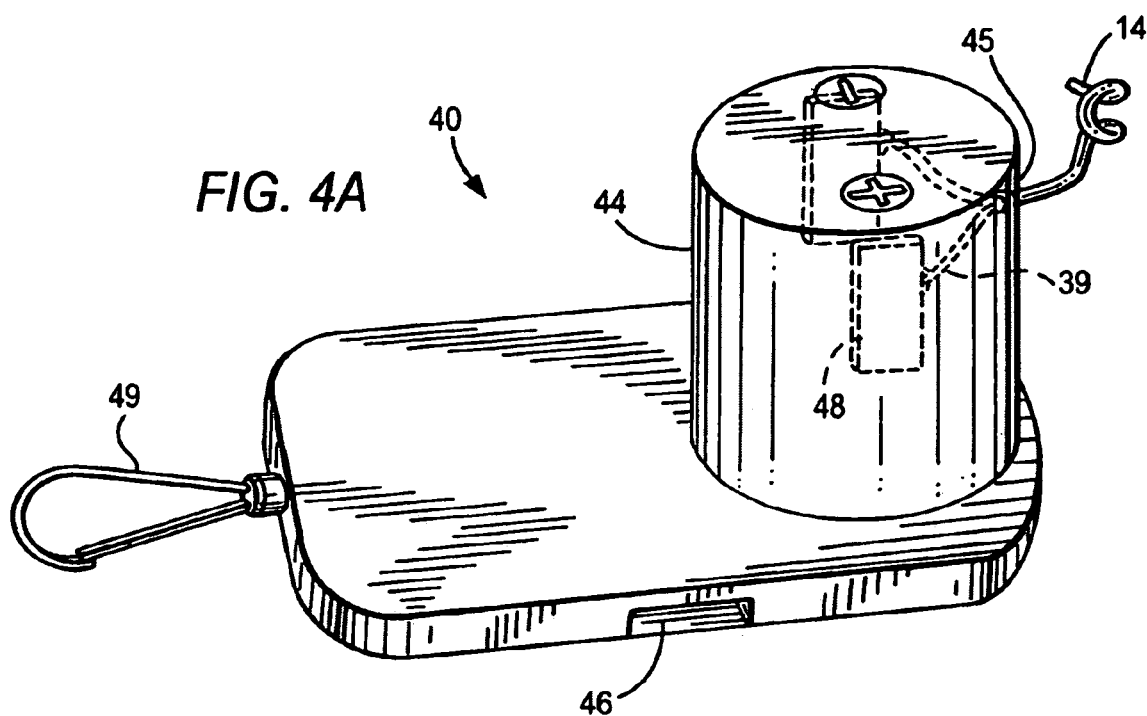
FIGS. 4A and 4B are perspective views of the battery connector shown in FIG. 2.
Figure 4B:
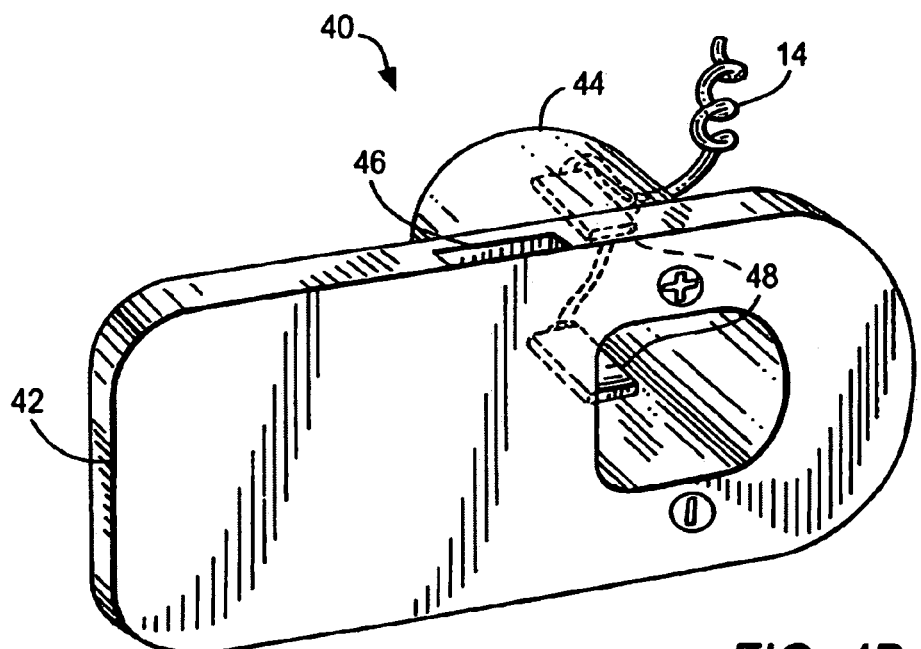

Referring to FIGS. 4A and 4B in conjunction with FIG. 2, the battery connector 40 is configured to physically engage and provide electrical contact with the base 52 and contact member 54 of the battery 50. The connector 40 comprises a base 42, a contact member housing 44, a retaining mechanism 46, and terminals 48. In one embodiment, the contact member housing 44 is substantially tubular in shape and is sized for receiving the contact member 54 of the battery. The contact member housing 44 illustratively extends approximately 90° from an upper surface of the base 42, and a bottom portion of the base 42 includes an opening to the contact member housing 44 for receiving the battery contact member 54.

In FIGS. 4A and 4B, the plurality of terminals includes a pair of terminals 48, with each terminal 48 positioned on opposing sides inside the contact member housing 44. The position of the terminals 48 correspond to the position of terminals 58 affixed to the battery 50, illustratively positioned on opposing sides. When the contact member 54 of the battery 50 is inserted into the battery connector 40, each terminal 58 of the battery 50 is aligned and in contact with a corresponding terminal 48 in the contact member housing 44 of the connector 40.

As described above, the terminals 48 of the connector 40 can include indicia of polarity (e.g., positive (+) and negative (−) symbols). The polarity indicators can be provided by labeling, molding into a surface of the base 42 of the connector 40, or by other conventionally known marking techniques.

As was discussed above with respect to the connector 30, the shape of the contact member housing 44 is preferably keyed to match the shape of the battery 50. As shown in FIGS. 4A and 4B, the contact member housing 44 includes a semi-circular sidewall portion and a substantially planar sidewall portion, which corresponds to a semi-circular sidewall portion and a substantially planar sidewall portion formed on the contact member 54 of the battery 50. As such, the contact member 54 of the battery 50 can only be inserted into the battery connector 40 when the planar sidewall of the contact member 54 is aligned with the planar sidewall formed in the contact member housing 44. Although the connector 40 is described as having a keyed sidewall, one skilled in the art will recognize that other conventional techniques for keying the connector 40 with the battery contact member 44 can be utilized, as was described above.

When the battery 50 is inserted into the contact member housing 44 of the connector 40, the retaining mechanism 46 is aligned and locks the connector 40 to the retaining mechanism 56 formed on the base 52 of the battery 50, and is releasable from the base 52 of the battery 50. Preferably, the same retaining mechanism 26 is implemented on the connector 40.

Referring to FIG. 4A, the second ends of the pair of conductors 39 (only one conductor is shown in FIG. 4A) are affixed to a corresponding terminal 48. That is, the conductor that is coupled to the positive terminal of the tool connector 30 is also coupled to the positive terminal of the battery connector 40. Similarly, the conductor that is coupled to the negative terminal of the connector 30 is also coupled to the negative terminal of the connector 40. The conductors 39 are securely fastened to their respective terminals 48 by any conventional electrical fastening techniques.

In one embodiment, an orifice 45 is formed in the contact member housing 44 for routing the second ends of the power cord conductors 39 to the terminals 48. Preferably, the power cord 14 is routed through the rear portion of the contact member housing 44. Alternatively, the power cord 14 can be routed through an orifice 45 formed on any side or top of the contact member housing 44.

The power cord 14 may be any conventional pair of conductors having a wire gauge suitable for carrying the current (e.g., two amps) from the battery 50 to the motor of the power tool 20. In one embodiment, the power cord 14 is a coiled power cord or a reeled power cord, which reduces the length of the cord 14 when it is not extended for use. The conductors of the power cord 14 are encased in a protective insulative sheath, such as plastic or rubber material, as conventionally known in the art.

The power cord 14 can be fixedly attached at each end to the connectors 30 and 40 by soldering or fasteners. Alternatively, the power cord 14 can be removably attached at one or both ends of the cord by use of, for example, a polarized plug-and-socket combination. As shown in FIG. 2, a plug and socket 19 is attached at each end of the cord 14, proximate the connectors 30 and 40, each of which has a power cord pig tail extending from the connector base. The cord preferably has a locking mechanism to prevent it from being inadvertently pulled from the adapter during use of the tool. A keyed plug and socket can also provide the proper orientation for polarity. Alternatively, the sockets or plugs can be formed, for example, within the base 32 of the connector 30 or the contact member housing 44 of the connector 40. In this latter embodiment, the adapter 10 can be easily stored without excessive twisting or stresses placed on the power cord and the terminals.

With continuing reference to FIG. 4A, there is shown attached to the base a fastener 49, illustratively a spring clip, to enable the user to, attach the battery connector to an article of clothing or other special accessory worn by the user. Other types of fasteners can be used.

Figure 6:
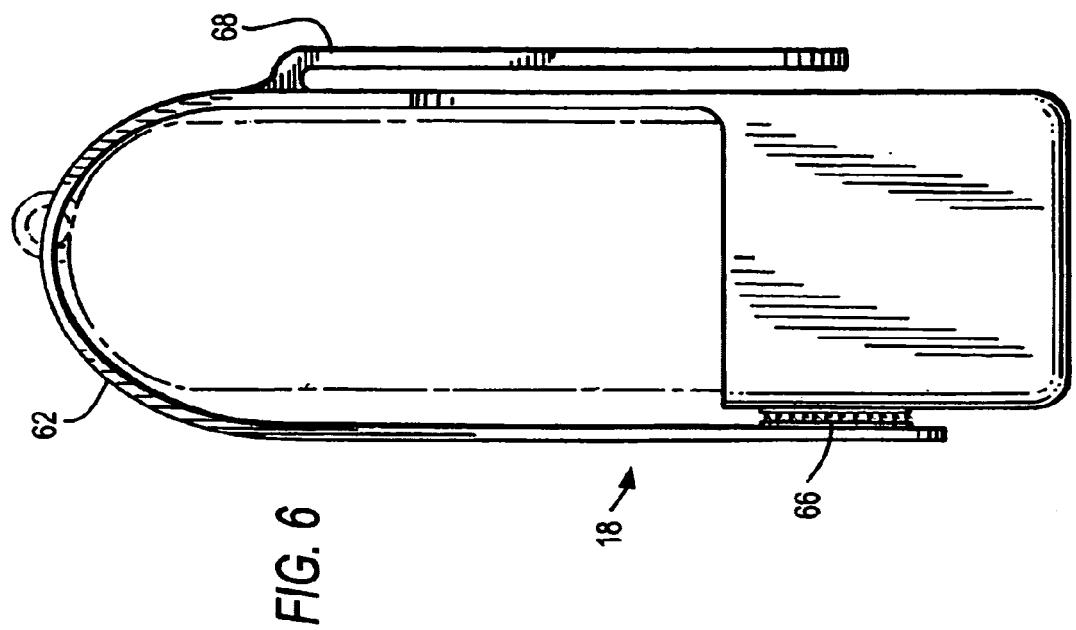
FIG. 6 is a side elevation view of the carrier of FIG. 5.
Figure 5:
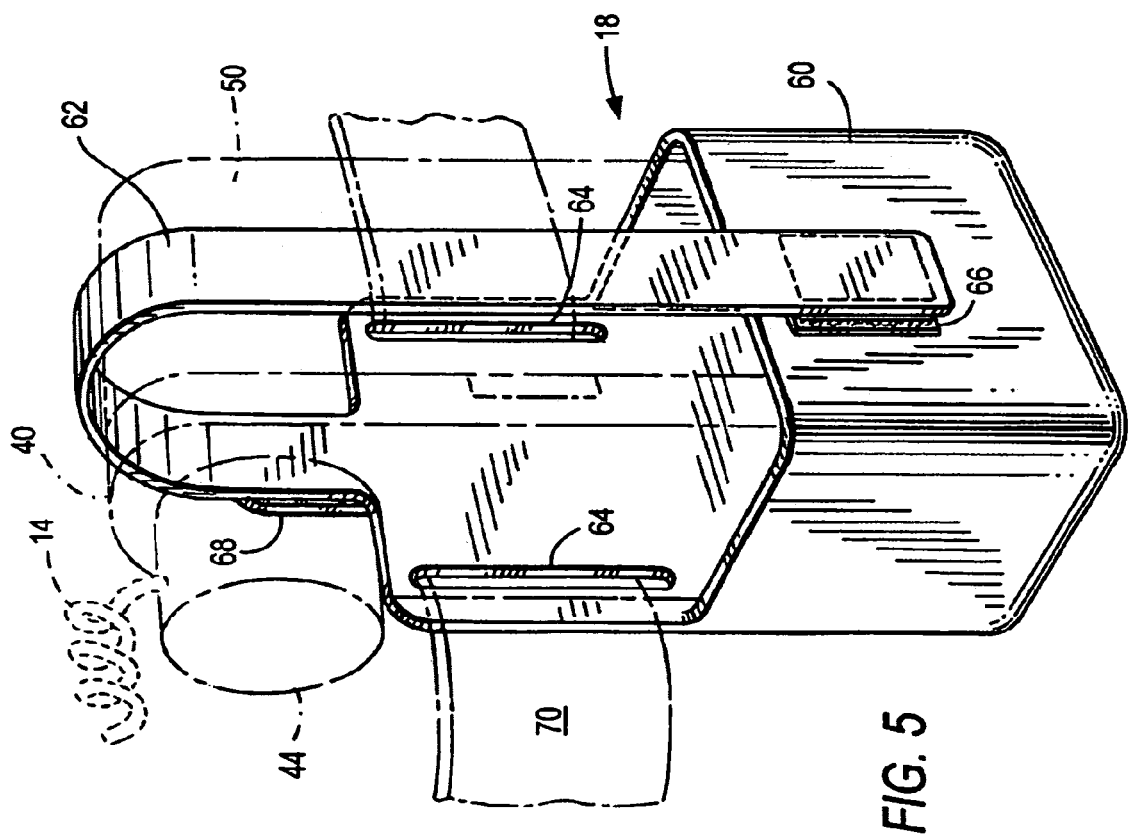
FIG. 5 is a perspective view of one embodiment of a portable battery carrier suitable for remotely carrying one or more batteries associated with the power tool.

Referring now to FIGS. 5 and 6, one embodiment of a suitable portable battery carrier 18 is illustrated. The carrier includes a pouch 60 adapted to receive assembled battery 50 and battery connector 40, and is provided with retaining means such as strap 62 that is provided with a fastener 66, illustrated in this embodiment as hook and loop fasteners (i.e., VELCRO®). The carrier 18 is also preferably provided with means for its attachment to an article of clothing, such as a belt worn by the user. In this embodiment, openings 64 are provided to permit the passage of a portion of the user's belt or a separate harness or strap 70 (shown in phantom) as illustrated in the side view of FIG. 6. A clip type fastener 68 can also be attached to an exterior wall of the holster 18.

The carrier 18 can be fabricated from any of a wide variety of suitable materials, including natural or synthetic leather, nylon or natural woven canvas material and unitary molded plastics. As will be apparent to one of ordinary skill in the art, the variations and modifications can be undertaken to provide a suitable carrier in accordance with this general disclosure.

The carrier 18 can be modified to permit the user to carry more than one battery and, optionally, battery connector by providing a plurality of adjacent pouches 60, each with its own retaining member 62. As will also be apparent, the plurality of rechargeable batteries can be connected in parallel to provide a longer period of use of the power tool. Alternatively, the user can disconnect the battery connector when a first battery has been discharged and place the connector 40 on a second battery, thereby avoiding the necessity of returning to a remote charger to swap batteries. This mode of use will, of course, oblige the user to carry the discharged battery on his person until he returns to the location of the charger.

Figure 7:
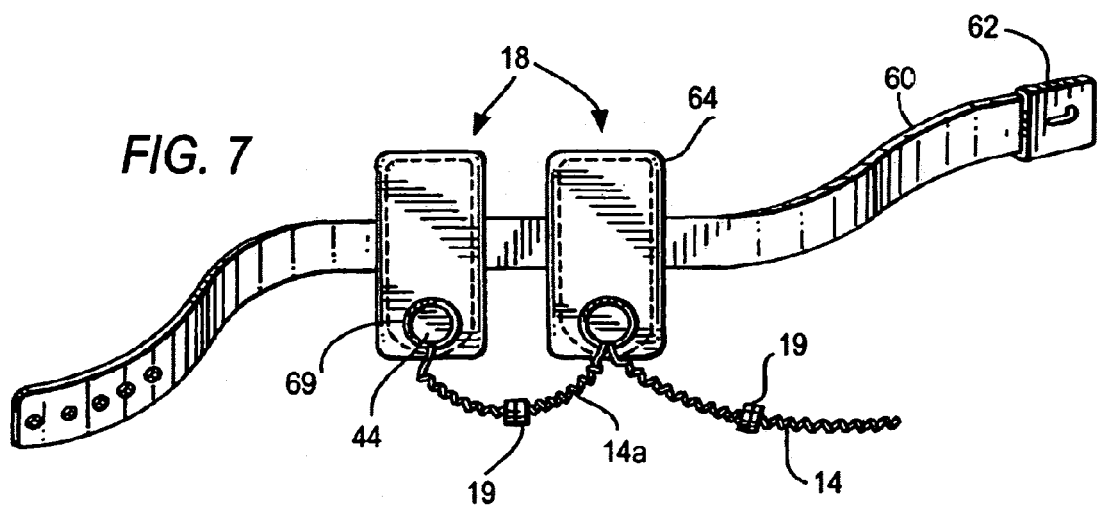
FIG. 7 is a perspective view of another embodiment of a battery carrier for use in the adapter system of the invention.

Referring now to the embodiment of FIG. 7, the pouch 60 includes an open portion 69 permitting the contact member 44 of the battery connector 40 and power cord 14 to extend outwardly. Alternatively, the contact member 44 can be enclosed in the pouch (not shown), and the opening sized to allow only the power cord 14 to exit.

When more than one battery 50 is being carried by a user, as shown in FIG. 7, the batteries 50 can be connected in parallel using a power cord extension 14a, if an additional connector 40 is available for housing the contact member 54 of the second battery 50. A switch is preferably provided for this purpose. Alternatively, the user can use the first battery 50 until its charge has dissipated and then switch the connector 40 from the discharged battery to the fully-charged battery in the second pouch. In any of the embodiments, the pouch 64 enables a user to carry at least one battery 50 and battery connector 40 with power cable 14 in order to provide power remotely to the power tool.

The embodiments of the adapter system 10 of the present invention, as shown and discussed with reference to FIGS. 1-7 enable a user to remove the battery from the power tool and to carry the battery remotely on the user's person while providing power to the tool. The adapter system 10 advantageously reduces user fatigue during prolonged usage by eliminating the added weight of the battery from the tool. Additionally, the user is able to easily maneuver the power tool in a more convenient manner than when the battery is mated with the power tool.

The connectors 30 and 40 are illustratively sized to fit a conventional plug-in battery for a particular manufacturer. A battery is typically interchangeable with many power tool products sold by a particular manufacturer. For example, an 18V rechargeable battery can be used in a cordless drill, reciprocating saw, and a lantern, among other power tools from that manufacturer. Accordingly, the adapter system will be interchangeable among the products in a line of a given manufacturer for a specified battery size.

Additional benefits of the adapter system 10 include mobility of the power tool and remote battery, without having to resort to using an extension cord that is fixedly attached to a wall socket or semi-permanent power source, such as an automobile, which restricts mobility and maneuverability of the power tool. Rather, the adapter of the present invention allows one or more batteries to be easily carried on a belt or harness worn by the user, thereby enabling unrestricted mobility of the user while performing work tasks.

During extremely cold weather the battery can be provided with an insulative cover to preserve its warmth and the battery can be placed inside of the user's protective clothing so that it receives some body heat, to thereby increase the power output.

The configuration of the adapter system 10 also facilitates easy storage, as the contact member 34 of the connector 30 can be inserted into and retained by the contact member housing 44 of the connector 44. Further, the power cord 14 can be either fixedly attached to assure its location during storage, or in another embodiment, can be removable for more compact storage and for packaging for retail sales.

Although various embodiments that incorporate the teachings of the present invention have been shown and described in detail above, those or ordinary skill in the art can readily devise other varied alternative embodiments that incorporate these teachings and that fall within the scope of the claims that follow.

I claim:

1. An adapter system for providing power to a portable power tool that includes a tool housing having a rechargeable battery receptacle, said tool's battery receptacle having electrical terminals and configured to receive a battery contact member having electrical terminals of a first releasably attachable original equipment manufacturer (OEM) battery, said adapter system comprising:

a tool connector having a contact member provided with electrical contacts, said contact member being configured for insertion into and retention by said tool's battery receptacle to provide electrical connectivity with the tool receptacle terminals;

at least one battery connector, each at least one battery connector having a receptacle provided with electrical contacts, each of the at least one battery connector's receptacle being configured to receive the contact member of the OEM battery and provide electrical connectivity with the battery terminals, wherein the battery receptacle of the tool housing and the battery connector receptacle of each at least one battery connector are configured to directly and interchangeably receive the first releasably attachable OEM battery; and an electrically conductive power cord operably coupled to the terminals of the tool connector and the at least one battery connector.

2. The adapter system of claim 1, wherein said tool connector includes a base, and said contact member of said tool connector extends from said base.

3. The adapter system of claim 1, wherein said contact member of said tool connector is hollow and includes a pair of external electrical terminals, portions of which terminals extend to the interior of the contact member.

4. The adapter system of claim 3, wherein each of said pair of electrical terminals are coupled to a first end of a corresponding conductor in said power cord.

5. The adapter system of claim 3, wherein said power cord is coupled to said pair of terminals through the base of the tool connector.

6. The adapter system of claim 2, wherein said base of the tool connector comprises at least one retaining means for releasably attaching said connector to said tool housing.

7. The adapter system of claim 6, wherein the retaining means is compatible with a fastener on the OEM battery.

8. The adapter system of claim 6, wherein the power cable extends from the contact member of the battery connector.

9. The adapter system of claim 3, wherein said base of said tool connector is configured to cover at least a portion of said tool receptacle when said contact member of said connector is inserted into said tool receptacle.

10. The adapter system of claim 1, wherein each at least one battery connector comprises a base and a contact member housing extending from a surface of said base, said contact member housing having an interior defining the battery receptacle of the battery connector.

11. The adapter system of claim 10, wherein said battery receptacle of said battery connector includes a pair of electrical terminals configured to provide electrical connectivity with corresponding terminals on said OEM battery.

12. The adapter system of claim 11, wherein each of said pair of electrical terminals of said at least one battery connector are coupled to a second end of the corresponding conductor in said power cord.

13. The adapter system of claim 11, wherein said power cord is coupled to the terminals through the battery receptacle of said at least one battery connector.

14. The adapter system of claim 10, wherein said base of each at least one battery connector comprises at least one retaining means for removably attaching said connector to said OEM battery.

15. The adapter system of claim 14, wherein the retaining means is compatible with a fastener on the OEM battery.

16. The adapter system of claim 14, wherein said power cord is detachable from one or both of the tool and battery connectors.

17. The adapter system of claim 3, wherein each at least one battery connector has a base sized to cover at least a portion of said battery when the contact member of the OEM battery is inserted into said battery connector's receptacle.

18. The adapter system of claim 1, wherein each at least one battery connector includes fastening means for releasably attaching the connector and battery to clothing or an accessory worn by a user of the tool.

19. The adapter system of claim 18, wherein said fastening means comprises a fastener selected from the group consisting of a clip, a hook, a strap, a clasp and a carabiner.

20. The adapter system of claim 1, further comprising at least one carrier for securely receiving and retaining the at least one battery connector and OEM battery respectively, each carrier including means for releasably attaching the carrier on clothing or an accessory being worn by a user of the tool.

21. The adapter system of claim 1, wherein the at least one battery connector comprises a first battery connector and a second battery connector.

22. The adapter system of claim 21, further comprising a second releasably attachable battery, wherein the first and second battery connectors are configured to receive either one of the first and second releasably attachable batteries.

23. The adapter system of claim 21, wherein the first battery connector and the second battery connector are electrically coupled in parallel to electrically couple the first and second releasably attachable batteries in a parallel circuit.

24. The adapter system of claim 21, further comprising a switch for activating one of the first or second releasably attachable batteries to individually provide power to the portable power tool.

* * * * *

UNITED STATES PATENT AND TRADEMARK OFFICE
CERTIFICATE OF CORRECTION

PATENT NO.        : 7,629,766 B2                              Page 1 of 1
APPLICATION NO.   : 11/488372
DATED             : December 8, 2009
INVENTOR(S)       : Bernard Sadow It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 505 days.

Signed and Sealed this

Second Day of November, 2010

David J. Kappos
*Director of the United States Patent and Trademark Office*